United States Patent [19]

Brindle et al.

[11] Patent Number: 4,654,653
[45] Date of Patent: Mar. 31, 1987

[54] DIGITAL DATA COMMUNICATION APPARATUS

[75] Inventors: Ralph C. Brindle, Minnetonka; Kenneth B. Kidder, Coon Rapids, both of Minn.

[73] Assignee: Honeywell Inc., Minneapolis, Minn.

[21] Appl. No.: 531,990

[22] Filed: Sep. 12, 1983

[51] Int. Cl.$^4$ .............................................. H04L 7/00
[52] U.S. Cl. .................. 340/825.2; 340/318; 340/501; 370/82; 375/117; 455/68
[58] Field of Search ................ 375/114, 117; 370/60, 370/82, 83, 94; 307/516; 455/68, 70; 340/501, 318, 644, 825.2, 825.21

[56] References Cited

U.S. PATENT DOCUMENTS

| | | | |
|---|---|---|---|
| 3,257,644 | 6/1966 | Moore | 340/501 X |
| 4,175,238 | 11/1979 | Breimesser et al. | 340/825.21 X |
| 4,215,276 | 7/1980 | Janeway | 340/825.21 X |
| 4,240,077 | 12/1980 | Hughes et al. | 340/501 X |

OTHER PUBLICATIONS

Ryan, Ray, "Basic Digital Electronics", Tab Books, Blue Ridge Summit, Pa., 1975, pp. 54, 55.

Primary Examiner—Ulysses Weldon
Attorney, Agent, or Firm—Charles L. Rubow

[57] ABSTRACT

An asynchronous one way digital data communication system is disclosed in which a first microcomputer produces a series of groups of pulses at a first port representative of digits in an information packet to be transmitted, the groups being separated by strobe pulses at a second port. The pulses drive switches in two current paths to control current therethrough supplied by a receiver module including a second microcomputer having a serial input port connected to an internal counter and an interrupt port. Current detectors supply pulses corresponding to currents in the paths to the serial input and interrupt ports, from which the second microcomputer reproduces the information packet.

7 Claims, 3 Drawing Figures

DIGITAL DATA COMMUNICATION APPARATUS

BACKGROUND OF THE INVENTION

The invention disclosed herein relates generally to apparatus for communicating digital data, and more particularly to a method and apparatus for asynchronous one way communication from one computing device to another requiring minimum hardware and minimum computing device overhead.

The use of microprocessors and microcomputers for performing a wide variety of data processing tasks, particularly in conjunction with equipment control applications, is rapidly expanding. An increasing number of such applications utilize microprocessors or microcomputers at various separated locations in a total system. It is often necessary for one such microcomputer to communicate data to another.

Communication between computing devices requires both program capacity and memory capacity. Since the capacity of a microcomputer is limited, it is desirable that the transmitting and/or receiving operations require a minimum amount of computing power and storage.

To at least some extent, the data communication burden on a microcomputer can be relieved through the use of external devices, interfaces and circuitry. However, it is also desirable that the complexity and cost of the external portions of the communication link be minimized.

The applicant has provided a unique, simple and low cost method and apparatus for achieving digital data communication from one microcomputer to another. Both the burden placed on the microcomputer and the amount and complexity of external circuitry are minimized.

SUMMARY OF THE INVENTION

The data communication apparatus and method of the present invention basically comprises a transmitter operable to produce a sequence of groups of pulses corresponding to a plurality of digits in an information packet at a first port, each group of pulses being followed by a strobe pulse at a second port. The first and second ports of the transmitter are connected to counter and interrupt input ports respectively of a receiver through a pair of controllable paths between a current source and a current sink. Each path includes a switching device controlled by the pulses which appear at one of the first and second ports of the transmitter. Each of the interrupt and counter input ports of the receiver receives pulses from a current detector associated with one of the paths, whereby the pulses transmitted by the transmitter are replicated at the receiver. The transmitter and receiver may comprise microcomputers, of which the receiving microcomputer is programmed to recognize the number of pulses in each group between a pair of strobe pulses as a digit in the information packet. Each information packet may include data and a RAM address in the receiving microcomputer at which the data is to be stored. The data and address digits may be in hexadecimal format and preceded by a pulse group representing a hexadecimal F which may be preceded by nine digits each having a value 4. The data and address digits may also be followed by a check sum digit.

DESCRIPTION OF THE PREFERRED EMBODIMENT

Figure 1:
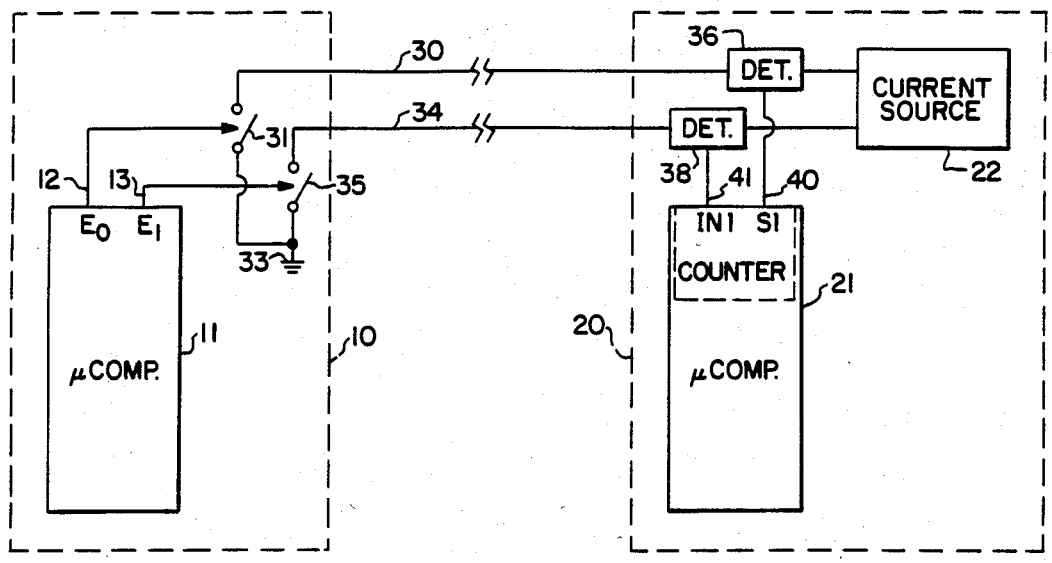
FIG. 1 is a block diagram of asynchronous, one way data communication apparatus in accordance with the applicant's invention.

In FIG. 1, reference numeral 10 identifies a transmitter module including a first microcomputer 11 which contains an information packet to be transmitted to a receiver module 20 including a second microcomputer 21. Microcomputer 11 is programmed to output the information packet in the form of a series of groups of pulses at a first output port $E_0$ identified by reference numeral 12. Each group of pulses represents a separate digit in the information packet. In preferred form, each digit may be from zero to F hexadecimal, and thus represented by from zero to 15 pulses. Microcomputer 11 is further programmed to produce a strobe pulse at a second output port $E_1$ identified by reference numeral 13 following each group of pulses at output port 12.

Receiver module 20 contains a current source 22 which supplies current to a data conductor 30 which is connected to a switch 31 controlled by the signals at port 12. Specifically, when a pulse is produced at port 12, switch 31 closes to provide a path to a current sink shown as ground 33. Similarly, current source 22 supplies current to a strobe conductor 34 which is connected to a switch 35 controlled by the signals at port 13. Thus, when a pulse is produced at output port 13, a corresponding current flows in conductor 34.

Detectors 36 and 38 are associated with conductors 30 and 34 respectively. Detectors 36 and 38 supply pulses to counter and interrupt input ports 40 and 41 of microcomputer 21 when current is detected in conductors 30 and 34, respectively. Thus, the groups of pulses produced at output port 13 of microcomputer 11 are reproduced at counter input port 40 of microcomputer 21 which is connected to an internal counter in the microcomputer. Similarly, pulses produced at output port 13 of microcomputer 11 are reproduced at interrupt port 41 of microcomputer 21.

Figure 2:
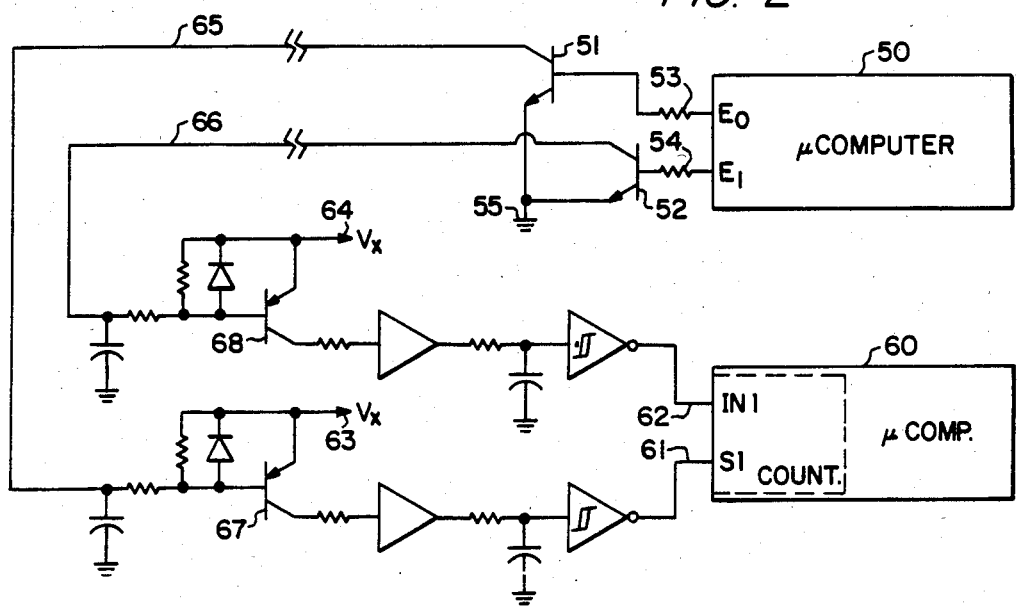
FIG. 2 is a schematic circuit diagram of the communication apparatus of FIG. 1.

Apparatus according to the foregoing description has been specifically applied to a control system for space temperature control equipment having a thermostat module located in the temperature controlled space and a control module remotely located at the site of mechanical heating, cooling and economizer equipment. A specific implementation for this application is shown in FIG. 2 in which the transmitter module is implemented with an OKI 5840 microcomputer commercially available from OKI Electric Ltd. The base drives for NPN transistors 51 and 52 are supplied from output ports $E_0$ and $E_1$ through resistors 53 and 54, respectively. Microcomputer 50 is programmed with a plurality of subroutines which generate messages or information packets to be communicated. A communication subroutine creates a message, including a check sum, and leaves it in a buffer in the microcomputer. An internal timer in the microcomputer is set to interrupt routine microcomputer operations every two milliseconds. An interrupt handler provides a pointer to the digit being transmitted and flags to indicate the states at each of the two output ports.

On each interrupt, the handler produces a positive or negative going transition at one of the ports. At each transition pair associated with the representation of a digit, it also decrements the digit to which it is pointing in the buffer. When the digit passes through zero, a transition pair is created at the other output port, and the handler moves the pointer to the next digit in the buffer. The message is destroyed in the process. However, that is not significant because the message is not acknowledged by the receiver, and there is no need for it to be retransmitted.

A COPS 320 L microcomputer commercially available from National Semiconductor, Inc., identified by reference numeral 60, has been found suitable for use in the receiver module. This microcomputer has a serial input port identified by reference numeral 61 connected to an internal counter and an interrupt port 62.

Terminals 63 and 64 in the receiver module are connected to a current source for supplying current to switches 51 and 52 through conductors 65 and 66 and associated circuit components respectively. The currents in conductors 65 and 66 are controlled by pulses produced at output ports $E_0$ and $E_I$ through switches 51 and 52, respectively. Any current in conductor 65 is detected by a detector comprising PNP transistor 67 and associated circuit components. The signal produced by this detector is conditioned as necessary and supplied to serial input port 61 of microcomputer 60. Similarly, a current detector including PNP transistor 68 produces a signal in response to current in conductor 66. The signal produced by this detector is conditioned as necessary and supplied to interrupt port 62 of microcomputer 60.

Microcomputer 60 utilizes its interrupt input and internal counter, connected to serial input port 61 to process messages from the transmitter module. Describing operation beginning with receipt of a strobe pulse on interrupt port 62, microcomputer 60 is programmed to store the status of any task it is then performing and transfer control to a message handling procedure which fetches the contents of the counter. This count is the number of data pulses received since the last strobe pulse. The counter is then cleared of its contents and made ready for counting the next group of data pulses.

The counts obtained from the counter are stored in a buffer. If the count is the sixth of the sequence, a check sum test is applied. If the test is passed, the contents of the buffer are flagged for storage. Otherwise, the contents of the buffer are discarded. As will hereinafter be described, a count of fifteen in the counter is interpreted as the beginning of a new information packet. After each pass through the message handling procedure, the microcomputer resumes its previously interrupted task.

Figure 3:
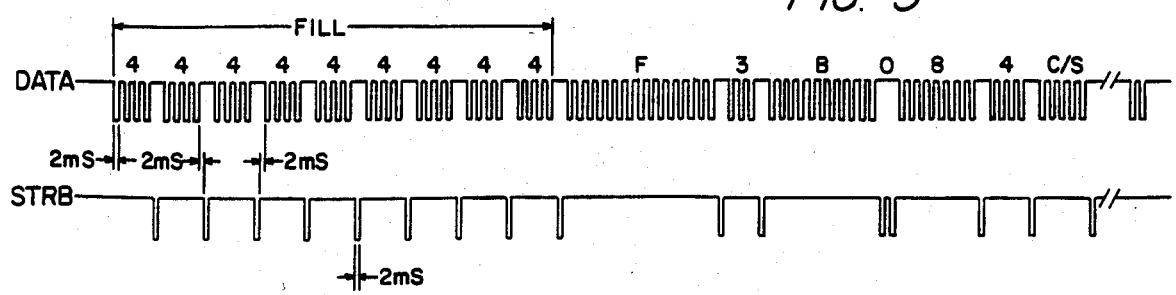
FIG. 3 illustrates a preferred communication format used in the apparatus of FIGS. 1 and 2.

The communication format illustrated in FIG. 3 has been found particularly suitable for use in the previously described apparatus. In the example of FIG. 3, the information packet represents the transmission of a cooling set point of 72°. The packet begins with nine fill digits each having a value of 4 to purge any faulty transmissions and assure synchronization. This is followed with a start digit having a hexadecimal value F represented by 15 pulses. The start digit signifies the beginning of the information. The next two digits contain the address of the location in which to store the information in the receiving microcomputer, least significant digit first. The next three digits comprise the information to be stored, least significant digit first. In this case the information is 48.0 hexadecimal or 72. Finally, a check sum digit is included. The check sum digit is chosen so that the four bit overflow sum of the digits following the start digit is also F.

In the heating control system example used to describe the present invention, the address field of the packet not only represents a RAM address where the information is to be stored, but also conveys the type of information being sent, i.e., heat set point, cool set point, etc. The ability to write to any location in the RAM of the receiving microcomputer makes possible changes in the operation of the receiver module for testing and check out procedures without altering the programs stored in the ROM of the receiving microcomputer.

Although a specific embodiment of the applicant's invention has been shown and described for illustrative purposes, a number of variations, modifications and applications will be apparent to those skilled in the relevant arts. It is not intended that coverage be limited to the embodiment shown, but only by the terms of the following claims.

The embodiments of the invention in which an exclusive property or right is claimed are defined as follows:

1. Digital data communication apparatus comprising:
    a transmitter for transmitting an information packet comprising a plurality of digits, said transmitter being operable to produce a sequence of groups of pulses at a first port, each group of pulses being indicative of one digit in the information packet, said transmitter further being operable to produce a strobe pulse at a second port following production of each group of pulses at the first port;
    a current source;
    a current sink;
    first switching means having a control terminal connected to the first port of said transmitter;
    first connecting means connecting said first switching means between said current source and said current sink, said first switching means being operable to cause current to flow between said current source and said current sink when receiving a pulse from the first port;
    a first detector associated with said first connecting means and operable to produce a pulse in response to current therethrough;
    second switching means having a control terminal connected to the second port of said transmitter;
    second connecting means connecting said second switching means between said current source and said current sink, said second switching means being operable to cause current to flow between said current source and said current sink when receiving a pulse from the second port;
    a second detector associated with said second connecting means and operable to produce a pulse in response to current therethrough;
    a receiver, including a counter connected to said first detector through a serial input port, and having an interrupt port which is connected to said second detector, said receiver being operable to count the pulses in each group received at the serial input port between pulses received at the interrupt port and to reconstruct the information packet transmitted by said transmitter.

2. The digital data communication apparatus of claim 1 wherein:
    said transmitter and receiver are located remotely from one another;

said first and second switching means are located at the site of said transmitter;

said current source and said first and second detectors are located at the site of said receiver;

said first connecting means comprises a conductor connecting said first switching means and said first detector; and said second connecting means comprises a conductor connecting said second switching means and said second detector.

3. The digital data communication apparatus of claim 2 wherein said transmitter and said receiver comprise first and second microcomputers respectively.

4. The digital data communication apparatus of claim 3 wherein each information packet comprises data and a random access memory address in said second microcomputer where the data is to be stored.

5. The digital data communication apparatus of claim 4 wherein the digits are in hexadecimal form, the numbers of pulses in each group corresponds to the hexadecimal value of the digit represented thereby and the address and data digits are preceded by a start digit having a value of hexadecimal F.

6. The digital data communication apparatus of claim 5 wherein the digit hexadecimal F is preceded by nine digits each represented by four pulses.

7. The digital data communication apparatus of claim 6 wherein said address and data digits are followed by a check sum digit.

* * * * *